2,827,416

ALIPHATIC ACID 2,4-DINITROPHENYLHYDRAZIDE COMPOSITIONS AND METHODS FOR TREATING COCCIDIOSIS

Theo A. Hymas, Midland, Mich., assignor to The Dow Chemical Company, Midland, Mich., a corporation of Delaware No Drawing. Application February 1, 1955
Serial No. 485,613

12 Claims. (Cl. 167—53.1)

This invention relates to animal husbandry and is particularly concerned with a method and composition for the control of gastro-intestinal parasites.

Domestic animals are subject to attack by a number of different gastro-intestinal parasites. Certain of these parasites are minute protozoan organisms known as coccidia. These protozoan organisms are the causative agents of coccidiosis which is a particularly prevalent and destructive disease of fowl such as chickens, geese and turkeys. The disease is also found in dogs, calves, lambs, pigs and other domesticated animals.

The coccidia invade and multiply in various organs but particularly in the gastro-intestinal tract of their host. During the process of growth and multiplication they erode the epithelial tissue of the cecum and intestine bringing about hemorrhage, anemia, weakness, serious digestive disturbances and intestinal necrosis. Animals, if they do not rapidly succumb to the infection are oftentimes rendered economically valueless by chronic forms of the disease.

Numerous remedies have been suggested for the control of gastro-intestinal parasites. Their administration often has been through the water or feed for the animals. Many of these materials have been of little efficacy, while others have been too expensive or too toxic for prophylactic administration. One of the difficulties encountered in their use has been the adverse effect which certain of the materials have upon the animals in retarding growth. Another difficulty has been the poisoning of the blood-forming organs and a subsequent reduction in the number of red and white blood cells in the body. These effects have made the use of many remedies hazardous and unprofitable.

It is an object of the present invention to provide a new and improved practice for raising and benefiting domesticated animals and fowl. A further object is to provide a method for the control of gastro-intestinal parasites in animals. Another object is to provide a new method for the control of parasitic diseases of the gastro-intestinal tract of animals. An addiitonal object is the provision of a novel method for the control of coccidiosis. A further object is the provision of a method which may be employed prophylactically without adversely affecting the metabolic activity or blood-forming organs of the animal. Yet another object is the provision of novel feed compositions adapted to be employed in the new practice for raising and benefiting animals. Other objects will become apparent from the following specification and claims.

The new method of benefiting animals comprises dosing animals with a 2,4-dinitrophenylhydrazide of a lower aliphatic acid of the formula

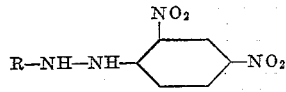

wherein R represents an acyl radical containing from 1 to 5 carbon atoms, inclusive, to protect them from parasitic diseases of the gastro-intestinal tract and particularly from coccidiosis. The 2,4-dinitrophenylhydrazide compounds are crystalline solids and inexpensive to prepare. They are not repellent to animals and preferably may be employed in admixture with animal feed. They may be administered continuously or intermittently in dosages sufficient to control gastro-intestinal parasites without adversely affecting the metabolic activity or blood-forming organs of the fowl, or imparting any unpalatable characteristics to animal flesh.

The oral administration or feeding of an effective dosage of the hydrazide compounds is essential and critical for the practice of the present invention. In general, good results are obtained when the animals are fed a daily dosage of from 3 to 1000 milligrams of the hydrazide compounds per kilogram of body weight. Where prophylactic treatment is desired and the compounds are fed continuously, daily dosages of from 3 to 250 milligrams per kilogram of body weight have been found satisfactory. Where danger of reinfestation from contaminated feed or surroundings is low, good controls are obtained when the animals are fed a daily dosage of 75 milligrams or more per kilogram of body weight for a period of from 2 to 5 days, but preferably not for a longer period.

The method of the present invention may be carried out by the oral administration or feeding of the unmodified hydrazide compounds. However, the present invention also embraces the employment of a liquid, powder, mash, pellet or other animal feed composition containing the hydrazide compounds. In such usage, the compounds may be modified with one or more of a plurality of additaments or innocuous ingestible adjuvants including water, ethanol, skim milk, syrups, edible oils or other liquid carriers; surface-active dispersing agents such as the liquid and solid emulsifying agents; and edible solid carriers such as edible powders and commercial animal feeds, concentrates or supplements. Such augmented compositions are adapted to be fed animals to supply the desired dosage of active agent or to be employed as concentrates and subsequently diluted with additional carrier to produce the ultimate compositions.

The exact concentration of the hydrazide compounds to be employed in the compositions may vary provided that sufficient of the composition is ingested by the animal so as to provide the required dosage of active agent. For example, where direct administration to an individual animal is preferred, liquid or solid compositions containing from 5 to 95 percent by weight of the agent may be employed to supply the desired dosage. Where the compounds are provided as a constituent of the principal food ration, satisfactory results are obtained with food rations containing a minor but effective amount of the hydrazide compounds. The exact amounts of the compounds in the ration is dependent upon the food consumption and feeding habits of the animals concerned. In fowl, the required dosages may be supplied with mash compositions containing from 0.001 to 0.05 percent by weight of the active agents. Where the compounds are furnished in the drinking water, good results are obtained at concentrations of the agents in the water equal to one-half those employed when the compounds are supplied as a constituent in the principal food ration. In compositions to be employed as concentrates, the active agents may be present in a concentration of from 5 to 95 percent by weight.

Liquid compositions containing the desired amount of the hydrazide compounds may be prepared by dissolving the compounds in ethanol or an edible oil, or by dispersing them in water with the aid of a suitable surface-active dispersing agent such as an ionic or non-ionic emulsifying agent. Suitable surface-active dispersing agents include the glycerol and sorbitan esters of fatty acids and the polyoxyalkylene derivatives of fatty alcohols and of sorbitan esters. The aqueous compositions may contain one or more water-immiscible oils as a solvent for the active agent. In such compositions the water, oil and emulsifying agent constitute an aqueous emulsion carrier.

In the preparation of solid feed compositions the hydrazide compound may be mechanically ground with an edible solid such as oyster shell flour or a solid surface-active dispersing agent such as finely-divided bentonite, fuller's earth or attapulgite. These compositions may be administered in the form of capsules or tablets or dispersed in an animal feed and such feed used to supply a part or the entire ration. Alternatively, the hydrazide compounds may be dissolved in an organic solvent such as acetone or methylene chloride, the resulting mixture dispersed in an animal feed and the feed dried to remove the solvent. Also, the compounds may be dissolved in edible oil such as coconut oil, olive, cotton seed or peanut oil, and the resulting mixtures dispersed in the feed. These edible oil compositions may contain one of the aforementioned emulsifying materials as a dispersing agent.

The following examples illustrate the invention but are not to be construed as limiting:

*Example 1*

Twenty-five parts by weight of the 2,4-dinitrophenyl-hydrazide of acetic acid was ground with 75 parts of fuller's earth to prepare a composition which is adapted to be fed to animals or employed as a dispersible concentrate. Portions of this composition were dispersed in a commercial poultry starting mash to produce medicated feed compositions containing 0.025 and 0.01 percent by weight of the hydrazide compound.

These medicated feed compositions and unmodified starting mash were fed as a sole ration to groups of chickens of the same history. Each such test group consisted of ten birds which were ten days old. Twenty-four hours after initiation of the diets, 30,000 sporulated *Eimeria tenella* oöcysts were introduced directly into the crop of each bird. At the time of the initiation of the diets and upon the fifth and seventh days thereafter, the birds were weighed and the average weight per bird for each test group determined. During the interval between the fifth and seventh days, the coccidial infection generally causes maximum disturbances in the rate of growth of fowl. Another group of birds was left untreated and uninoculated to serve as an uninfected check. On the seventh day the inoculated birds were sacrificed and autopsied. An examination of each bird was made and the medicated birds compared to the unmedicated birds, as regards the extent of cecal and intestinal lesions resulting from coccidial infection, to determine the percentage control of coccidial disease. The average weights per bird at the aforementioned intervals and the percentage control of coccidial disease for the test groups are set forth in the following table:

| Percent by Weight of Active Agent in Mash | Average Weight per Bird in Grams at the Indicated Intervals Following the Initiation of the Diets | | | Percent Control of Coccidial Disease |
|---|---|---|---|---|
| | 0 Days | 5 Days | 7 Days | |
| 0.025 | 118 | 171 | 192 | 100 |
| 0.01 | 118 | 172 | 204 | 100 |
| Infected controls | 118 | 168 | 170 | (1) |
| Uninfected controls | 118 | 177 | 200 | |

[1] All birds heavily infested with coccidial disease.

*Example 2*

The 2,4-dinitrophenylhydrazide of formic acid and the 2,4-dinitrohydrazide of butyric acid were dispersed in fuller's earth to prepare dispersible concentrate compositions containing 25 percent by weight of one of the hydrazide compounds. Portions of these concentrate compositions and the concentrate compositions as prepared in Example 1 were dispersed in a commercial poultry starting mash to prepare medicated feed compositions containing 0.04 percent by weight of one of the hydrazide compounds. These medicated feed compositions were tested with unmodified mash in a manner similar to that described in Example 1. In such operations, each test group consisted of five birds and the birds were inoculated with 33,500 sporulated *Eimeria necatrix* oöcysts. The average weight per bird and the percentage control of coccidial disease for the test groups are set forth in the following table:

| 2,4-dinitrophenyl hydrazide | Average Weight per Bird in Grams at the Indicated Intervals Following the Initiation of the Diets | | | Percent Control of Coccidial Disease |
|---|---|---|---|---|
| | 0 Days | 5 Days | 7 Days | |
| Formic acid | 125 | 173 | 192 | 87 |
| Acetic acid | 125 | 169 | 187 | 95 |
| Butyric acid | 125 | 163 | 188 | 85 |
| Infected checks | 125 | 164 | 148 | (1) |
| Uninfected checks | 125 | 172 | 198 | |

[1] All birds heavily infested with coccidial disease.

*Example 3*

The 2,4-dinitrophenylhydrazide of propionic acid and the 2,4-dinitrophenylhydrazide of butyric acid were dispersed in fuller's earth to prepare dispersible concentrate compositions containing 25 percent by weight of one of the hydrazide compounds. These concentrate compositions were dispersed in a commercial poultry starting mash to prepare medicated feed compositions containing 0.04 percent by weight of one of the hydrazide compounds.

These medicated feed compositions and unmodified starting mash were fed as a sole ration to groups of chickens of the same history. Each such test group consisted of 10 birds which were 10 days old. Twenty-four hours after the initiation of the diets, 32,000 sporulated *Eimeria necatrix* oöcysts were introduced directly into the crops of the birds receiving the mash modified with the 2,4-dinitrophenylhydrazide of propionic acid and 49,000 sporulated *Eimeria tenella* oöcysts introduced into the crops of the birds receiving the diet modified with the 2,4-dinitrophenylhydrazide of butyric acid. Another group of birds was left untreated and uninoculated to serve as an uninfected check. Just prior to the initiation of the diets and at regular intervals thereafter the birds were weighed and the average weight per bird for each test group determined. The average weights per bird for the test groups are set forth in the following table:

| Interval Following Inoculation in Days | Average Weight per Bird in Grams | | |
|---|---|---|---|
| | Birds Receiving Mash Modified With the 2,4-Dinitrophenylhydrazide of Propionic Acid | Birds Receiving Mash Modified With the 2,4-Dinitrophenylhydrazide of Butyric Acid | Uninfected Check |
| 0 | 120 | 122 | 120 |
| 2 | 143 | 147 | 139 |
| 5 | 176 | 175 | 174 |
| 7 | 193 | 196 | 200 |
| 9 | 219 | 220 | 230 |
| 12 | 255 | 254 | 273 |
| 14 | 278 | 275 | 302 |
| 21 | 383 | 398 | 397 |
| 23 | 428 | 444 | 439 |

Example 4

A medicated feed supplement is prepared by grinding together 50 parts by weight of the 2,4-dinitrophenylhydrazide of valeric acid, 1 part of a sorbitan monopalmetate (Span 20) and 49 parts of aluminum magnesium silicate (attapulgite).

In a further operation, 20 parts by weight of the 2,4-dinitrophenylhydrazide of propionic acid is mechanically mixed with 80 parts of soybean meal to prepare a medicated animal feed concentrate.

Also, 90 parts by weight of the 2,4-dinitrophenylhydrazide of acetic acid is mechanically ground with 10 parts of bentonite to produce a parasiticidal concentrate.

In an additional operation 10 parts by weight of the 2,4-dinitrophenylhydrazide of formic acid is dispersed in 90 parts of cotton seed oil to prepare a concentrate composition in the form of an edible oil.

These compositions are adapted to be administered to animals to supply the desired dosage of hydrazide compound or to be employed as concentrates and subsequently diluted with additional edible carrier to produce animal feeds containing the desired amount of active agent.

The 2,4-dinitrophenylhydrazides of the lower aliphatic acids as employed in the present invention may be prepared by reacting 2,4-dinitrophenylhydrazine with a lower aliphatic acid. In carrying out the reaction substantially equimolecular proportions of the reagents are mixed together in an excess of the aliphatic acid reagent as reaction solvent and the resulting mixture heated for a period of time at the boiling temperature and under reflux. Upon completion of the reaction, the reaction mixture is diluted with excess water. During the latter dilution, the desired hydrazide product precipitates in the mixture as a crystalline solid. The latter may be separated by filtration and purified by recrystallization from an organic solvent such as ethylene dichloride.

I claim:

1. A method for benefiting animals and preventing and controlling coccidiosis which comprises feeding an animal a composition comprising a 2,4-dinitrophenylhydrazide of a lower aliphatic acid as an active ingredient in intimate admixture with an innocuous ingestible adjuvant, the composition being fed at a daily dosage corresponding to from 3 to 1000 milligrams of the active ingredient per kilogram of body weight.

2. In the practice of animal husbandry and preventing and controlling coccidiosis, the method which comprises dosing animals with a 2,4-dinitrophenylhydrazide of a lower aliphatic acid, said 2,4-dinitrophenylhydrazide compound being employed at a daily dosage of from 3 to 1000 milligrams per kilogram of body weight.

3. A method claimed in claim 2 wherein the daily dosage of the 2,4-dinitrophenylhydrazide compound is from 3 to 250 milligrams per kilogram of body weight.

4. A method claimed in claim 3 wherein the hydrazide compound is the 2,4-dinitrophenylhydrazide of propionic acid.

5. A method claimed in claim 3 wherein the hydrazide compound is the 2,4-dinitrophenylhydrazide of butyric acid.

6. A method claimed in claim 3 wherein the hydrazide compound is the 2,4-dinitrophenylhydrazide of acetic acid.

7. An animal feed for benefiting animals and preventing and controlling coccidiosis containing from 0.001 to 0.05 percent by weight of a 2,4-dinitrophenylhydrazide of a lower aliphatic acid, said lower aliphatic acid containing from one to five carbon atoms inclusive.

8. A poultry feed for benefiting poultry and preventing and controlling occidiosis containing from 0.001 to 0.05 percent by weight of the 2,4-dinitrophenylhydrazide of propionic acid.

9. A poultry feed for benefiting poultry and preventing and controlling coccidiosis containing from 0.001 to 0.05 percent by weight of a 2,4-dinitrophenylhydrazide of butyric acid.

10. A poultry feed for benefiting poultry and preventing and controlling coccidiosis containing from 0.001 to 0.05 percent by weight of the 2,4-dinitrophenylhydrazide of acetic acid.

11. A concentrate composition for benefiting animals and preventing and controlling coccidiosis comprising from five to 95 percent by weight of a 2,4-dinitrophenylhydrazide of a lower aliphatic acid in intimate admixture with an edible finely divided solid, said lower aliphatic acid containing from one to five carbon atoms, inclusive.

12. A concentrate composition claimed in claim 11 wherein the hydrazide compound is the 2,4-dinitrophenylhydrazide of propionic acid.

References Cited in the file of this patent

UNITED STATES PATENTS 2,510,487    Waletzky _____ June 6, 1950

OTHER REFERENCES

Friedlander: Proceeding of the Soc. for Experimental Biology and Medicine, vol. 81, December 1952, pp. 638–640.